(12) United States Patent
Gelbard

(10) Patent No.: US 10,268,923 B2
(45) Date of Patent: Apr. 23, 2019

(54) METHOD AND SYSTEM FOR DYNAMIC UPDATING OF CLASSIFIER PARAMETERS BASED ON DYNAMIC BUFFERS

(71) Applicant: Bar-Ilan University, Ramat Gan (IL)

(72) Inventor: Roy Gelbard, Tel Aviv (IL)

(73) Assignee: BAR-ILAN UNIVERSITY, Ramat Gan (IL)

( * ) Notice: Subject to any disclaimer, the term of this patent is extended or adjusted under 35 U.S.C. 154(b) by 118 days.

(21) Appl. No.: 15/393,761

(22) Filed: Dec. 29, 2016

(65) Prior Publication Data

US 2017/0185866 A1    Jun. 29, 2017

Related U.S. Application Data

(60) Provisional application No. 62/272,111, filed on Dec. 29, 2015.

(51) Int. Cl.
*G06K 9/62* (2006.01)

(52) U.S. Cl.
CPC ......... *G06K 9/6218* (2013.01); *G06K 9/6269* (2013.01)

(58) Field of Classification Search
USPC ............. 370/395.62; 382/159, 226; 707/812; 711/162
See application file for complete search history.

(56) References Cited

U.S. PATENT DOCUMENTS

| | | | | |
|---|---|---|---|---|
| 7,657,089 B2* | 2/2010 | Li | ...................... | G06K 9/00456 382/159 |
| 7,792,951 B2* | 9/2010 | Halim | ................. | G06F 17/3071 709/223 |
| 8,331,699 B2* | 12/2012 | Dewan | ................. | G06K 9/6209 382/159 |
| 8,438,163 B1* | 5/2013 | Li | ....................... | G06F 17/3028 382/159 |
| 8,447,120 B2* | 5/2013 | Ji | ........................ | G06F 17/3028 382/226 |
| 8,934,491 B2* | 1/2015 | Lee | ......................... | H04L 27/02 370/395.62 |
| 9,239,967 B2* | 1/2016 | Liu | ..................... | G06F 17/30247 |
| 2010/0131573 A1* | 5/2010 | Reese | ................... | G06F 3/0481 707/812 |

(Continued)

FOREIGN PATENT DOCUMENTS

WO    WO 2012140315 A1 *  10/2012    ......... G06K 9/00677

*Primary Examiner* — Xuemei G Chen
(74) *Attorney, Agent, or Firm* — Browdy and Neimark, P.L.L.C.

(57) ABSTRACT

A system and methods are provided for dynamic classifying in real time cases received in a stream of big data. The system comprises multiple remote autonomous classifiers. Each autonomous classifier generates a classification scheme comprising a plurality of classifier parameters. Upon receiving a case, the system determines from among the plurality of classifier parameters a most similar classifier parameter and the case may be added to a buffer of cases represented by the most similar classifier parameter. When a measure of error between the case and the most similar classifier parameter is greater than a threshold, the buffer is dynamically regrouped into one or more new buffers, according to a criterion of segmentation quality. One or more new classifier parameters, representing the one or more regrouped case buffers, are added to the classification scheme.

12 Claims, 2 Drawing Sheets

(56) References Cited

U.S. PATENT DOCUMENTS

| | | | |
|---|---|---|---|
| 2011/0219002 A1* | 9/2011 | Bartram | G06K 9/6215 |
| | | | 707/738 |
| 2012/0133789 A1* | 5/2012 | Wu | G06K 9/4652 |
| | | | 348/222.1 |
| 2012/0195475 A1* | 8/2012 | Abiko | G06T 7/00 |
| | | | 382/115 |
| 2013/0054909 A1* | 2/2013 | Li | G06F 11/1451 |
| | | | 711/162 |
| 2013/0218974 A1* | 8/2013 | Cao | H04W 4/08 |
| | | | 709/204 |
| 2014/0307956 A1* | 10/2014 | Criminisi | G06K 9/627 |
| | | | 382/159 |
| 2017/0011294 A1* | 1/2017 | Jagannathan | G06N 5/02 |
| 2017/0279725 A1* | 9/2017 | Lee | H04L 47/14 |

* cited by examiner

METHOD AND SYSTEM FOR DYNAMIC UPDATING OF CLASSIFIER PARAMETERS BASED ON DYNAMIC BUFFERS

RELATED APPLICATION DATA

The present application claims priority from U.S. Provisional Patent Application 62/272,111, filed on Dec. 29, 2015 and incorporated herein by reference.

FIELD OF THE INVENTION

In general, the present invention is directed to systems and methods of dynamic pattern finding, knowledge discovery, remote sensing and data classification. More specifically, the present invention is directed towards automatic classification of data in a big data system.

BACKGROUND

Big data architectures, that is, architectures for processing high velocity, high volume, high variability "big data streams", are enabling new applications for knowledge discovery. Big data is a term used for data sets that are so large or complex that traditional data processing applications are inadequate to deal with them. Such architectures are used today in finance for identifying transactions risks, in retail sales for personalizing marketing campaigns, in computer security for identifying malware and illegal network traffic, and in medicine for generating targets for new diagnostics and therapeutics. Further applications include grouping of web search results and news aggregation. Generally the data being classified is multi-dimensional, that is, includes many attributes or variables. Applications in these areas are also sometimes referred to as "complex event processing" or "event stream processing". Often these applications include processes for classifying data by classification schemes generated from previously acquired data.

Techniques for generating grouping-segmentation-classification schemes include univariate or multivariate distribution methods such as Gini index and ROC AUC, or clustering methods, such as K-means, and Ward. These latter methods are computationally intensive, meaning that they generally cannot be applied in real-time for complex event processing.

An example of training a classification scheme by clustering, in order to categorize technical support requests, is described by Barrachina and O'Driscoll, "A big data methodology for categorizing technical support requests using Hadoop and Mahout", Journal of Big Data, 2014 1:1.

Several methods have been disclosed in the prior art for updating classification schemes to reflect changing data patterns.

Hulten et al., "Mining Time-Changing Data Streams" (Proc. Seventh ACM SIGKDD Int. Conf. Knowledge Discovery and Data Mining, ACM Press, 2001) describes a system for generating decision trees "from high-speed, time changing data streams". The system updates a decision tree with a window of examples. Forman, "Tackling Concept Drift by Temporal Inductive Transfer" (SIGR '06, August 2006, ACM Press) describes reclassifying news on a regular basis, such as daily.

U.S. Pat. No. 9,111,218 to Lewis, et al. describes receiving a stream of documents and classifying each document according to a customer support issue or sentiment. The method includes assigning classification topics. A drift of one or more of the classifications is determined when a drift exceeds a predetermined threshold range, whereupon "the plurality of documents are re-clustered into the increased number of groups".

A further example is U.S. Pat. No. 8,919,653 to Olmstead, describing a classification scheme updated when exceptions are received for an automated checkout system. In the event of an exception, an outlet displays a visual representation of the exception, allowing a customer to clear the exception in an unassisted manner.

SUMMARY

According to an embodiment of the present invention, a system may include at least one processor and at least one memory communicatively coupled to the at least one processor and having computer-readable instructions that when executed by the at least one processor cause the system to classify, in real time, data from a big data stream. The system generates a classification scheme, by grouping a set of cases into a plurality of case buffers, and determines a respective plurality of classifier parameters, wherein each case buffer of the plurality of case buffers is represented by a respective classifier parameter of the plurality of classifier parameters. The system receives a new case and responsively determines, from among the plurality of classifier parameters, a classifier parameter most similar to the new case. The system determines that an error between the new case and the most similar classifier parameter is greater than a segmentation error threshold, and responsively adds the new case to a most similar case buffer, wherein the most similar case buffer is the case buffer represented by the most similar classifier parameter. The system generates one or more regrouped case buffers from the most similar case buffer, according to a criterion of segmentation quality, and adds to the classification scheme one or more new classifier parameters representing the one or more regrouped case buffers, and removes from the classification scheme the most similar classifier parameter.

Implementations can include one or more of the following features. When the similar case buffer is larger than a buffer threshold, one or more cases may be removed from the most similar case buffer before generating the one or more regrouped case buffers. One or more cases may be removed from the most similar case buffer according to an outlier criterion or a "first-in" criterion. One or more cases, when removed from the most similar case buffer, may be saved in a case history. At least one of the buffer threshold, the segmentation error threshold, and the criterion of segmentation quality may be automatically set based on a processing time target. One or more regrouped case buffers may be generated by selecting a clustering algorithm according to a time constraint and applying the clustering algorithm to the most similar case buffer. Generating the new classification scheme may include generating the new classification scheme on a local server and synchronizing the new classification scheme between the local server and a remote server. Generating the one or more regrouped case buffers may include generating two regrouped case buffers. Adding to the classification scheme the one or more new classifier parameters may include adding two new classifier parameters representing respectively the two regrouped case buffers.

The plurality of classifier parameters may include at least three classifier parameters, wherein the most similar classifier parameter may include at least two classifier parameters meeting a similarity threshold with respect to the new case, and adding the new case to the most similar case buffer may include generating the most similar case buffer by merging the case buffers represented by the at least two classifier parameters meeting the similarity threshold. Receiving the new case comprises normalizing a received data record.

The most similar classifier parameter may be determined by calculating error measures between the new case and all classifier parameters in the classification scheme, and setting the most similar classifier parameter as the classifier parameter having the minimum error measure. According to a further embodiment of the present invention, a method, implemented by an information handling system that includes a memory and a processor, may include generating a classification scheme comprising a plurality of classifier parameters, wherein the generation of the classification scheme may include grouping a set of cases into a plurality of case buffers, each case buffer being represented by a corresponding classifier parameter of the plurality of classifier parameters. The method includes receiving a new case, responsively determining from among the plurality of classifier parameters a classifier parameter most similar to the new case, and determining that an error between the new case and the most similar classifier parameter is greater than a segmentation error threshold. The new case is added to a most similar case buffer, wherein the most similar case buffer is the case buffer represented by the most similar classifier parameter. One or more regrouped case buffers are generated from the most similar case buffer, according to a criterion of segmentation quality. One or more new classifier parameters representing the one or more regrouped case buffers are added to the classification scheme, and the most similar classifier parameter is removed from the classification scheme.

The present invention will be more fully understood from the following detailed description of embodiments thereof.

BRIEF DESCRIPTION OF DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION OF THE INVENTION

Figure 1:
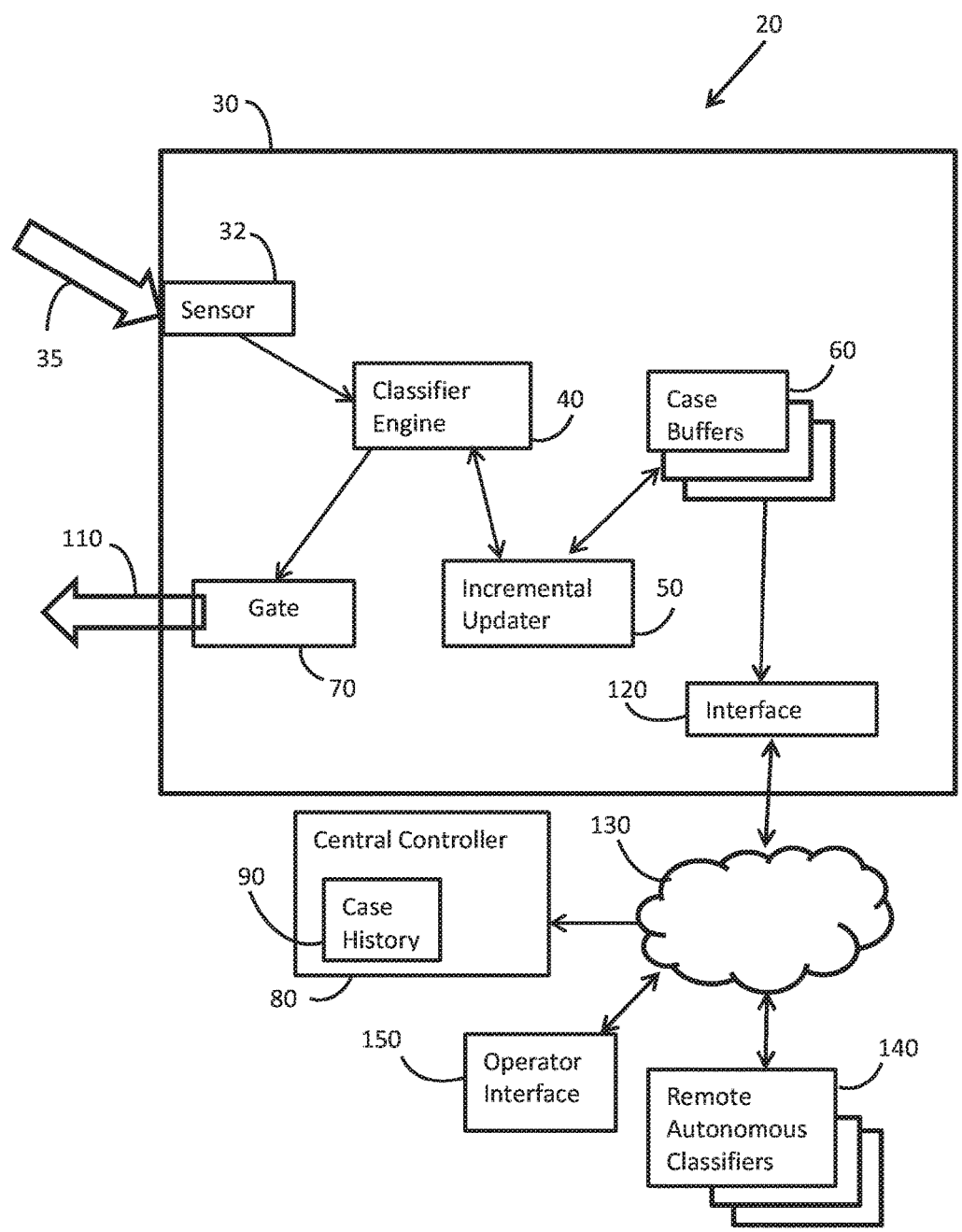
FIG. 1 shows a schematic, pictorial illustration of a system for real-time data classification and modification of a classification scheme, according to an embodiment of the present invention.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention provides a system and methods for real-time modification of a classification scheme for big data streams. A "real-time" process is one that allows a decision to be made within a relevant time frame of a given application, where the decision is based on a new classification scheme that includes the most recently classified case. Depending on the context of the application, "real-time" can be a response in less than one second, one second, within 10 seconds etc.

As provided by the present invention, an initial segmentation or grouping technique, such as clustering, is applied to an initial set of representative cases (alternatively referred to as events, instances, objects, vectors, or lists), so as to divide or segment the cases into segments or groups. Cases generally have multiple attributes. For example, cases in an application for text classification could be lists of keywords or bag of words (represented as text or as numerical values), generated by filtering the target text messages. In an airport security system, cases might be lists of biosensor measurements taken from travelers, for example, when walking through security gates. In a social media advertising platform, cases might be lists of user attributes, such as age range, political interests, music tastes, etc. Cases may be also be observations or records, including any type of network traffic, which may include any combination of text, numbers, symbols, and control data. Generally, cases are represented as vectors of attributes.

During or after the initial segmentation or grouping of cases, differentiating characteristics of the individual groups are calculated or identified, these differentiating characteristics referred to herein below as "classifier parameters". A classification scheme includes the full set of classifier parameters for each of the segmented groups. After the classifier parameters are determined, a new case may be "classified" by determining the classifier parameter to which the case is "most similar". Like the cases, the classifier parameters may also be multi-dimensional objects, such as vectors. In some embodiments, a classifier parameter is the mean vector of the group that the parameter represents.

As new cases are received by the system of the present invention, some cases are received that do not suit the initial classification scheme. That is, the new cases are anomalies. Re-applying the original clustering technique to the set of initial and received cases would not be possible in real-time. The classification scheme generated by the system and methods provided herein is an approximation of classification schemes that would be generated by known methods, such as clustering methods, if there were not a real-time limitation on the process.

Reference is made to FIG. 1, a schematic, pictorial illustration of a classifier system 20, according to an embodiment of the present invention. The system includes a dynamic classifier 30, which may also be referred to as a classifying or case sensor. The dynamic classifier includes several modules that operate together to receive cases, to update a classification scheme and to classify and to store the cases. The primary modules of the dynamic classifier are: an input sensor 32, configured to receive cases from a data stream 35; a classifier engine 40, which classifies cases based on the classification scheme described above; an incremental updater 50 that updates the classification scheme when an anomalous case is identified; and case buffers 90, which initially store the groups of cases of an initial segmentation, and which are updated to store new cases, as described further herein below.

Data stream 35 may be a big data stream, characterized by a high volume, a high velocity, and a high variability. In some embodiments, data stream 35 may be generated by multiple sources, such as social media communications and sensor devices. Sources may also include seismic data, weather sensors, or Internet of Things (JOT) devices.

Input sensor 32 extracts from data stream 35 cases to be classified. The input sensor typically performs one or more filtering and/or processing steps on the cases, such as extracting subsets of features or characteristics of each case or performing a data conversion. Cases that include multiple types of features (e.g., textual, ordinal, or numerical) may be normalized and converted to numerical vectors.

Normalization of the cases enables a classification algorithm to rank multi-attribute cases in an n-feature space and to generate a single measure of a "distance" or error, or, conversely, similarity of cases. To perform the normalization, the input sensor may include tables, dictionaries, and normalization parameters that give various weights to each feature of the n-feature case vector. Generally, the normalization parameters are set manually by human operators, but may also be set by automated learning algorithms.

The classifier engine 40 is a parameter-based classifier configured to receive cases filtered by the input sensor. The classifier engine is configured with a set of parameters, referred to herein below as a classification scheme.

Parameters of the classifier engine may be generated initially by a segmentation and/or grouping algorithm (such as segmentation, classification or clustering etc.) operating on an initial set or "training set" of cases, as described above. One well-known algorithm is the "k-means" clustering method. Alternative methods include processes known as "hierarchical", "projected" and "subspace" clustering, as well as other methods described hereinabove. The k-means method is an iterative process that groups vectors in a manner designed to meet quality criteria. In particular, a criterion of quality imposed by k-means and other clustering algorithms relates to minimizing distances, such as the root mean square error (RMSE), between the vectors in each group and the "center" or mean of that group. Clustering is generally "unsupervised" meaning that the clusters are generated automatically. Methods for measuring quality of a clustering operation are described in Sulc at al., "Evaluation of Selected Approaches to Clustering Categorical Variables", Statistics in Transition, Autum 2014, Vol. 15, N. 4, pp. 592-610.

In structured, or semi-supervised clustering, various quality criteria may be manually tuned, including the number of iterations (Finley and Joachims, *Supervised k-Means Clustering, Cornell Computing and Information Science Technical Report,* 1813-11621, 2008). More computationally intensive clustering algorithms, such as CLIQUE, identify dense clusters in subspaces of maximum dimensionality, producing identical results irrespective of the order in which input records are presented (Agrawal, et al., *Automatic Subspace Clustering of High Dimensional Data, Data Mining and Knowledge Discovery,* July 2005, Volume 11, Issue 1, pp 5-33).

For each clustered group of cases, the clustering algorithm also generates a parameter to represent the group, the parameter typically defined as an n-dimensional vector, or "centroid" of the n-dimensional space. The set of generated parameters are the classifier parameters of the initial classification scheme of the classifier engine.

Classification of a new case is performed by calculating a case error (or, conversely, a similarity measure) between the new case and each classifier parameter. Depending on the type of clustering, the case error may be calculated as a distance or difference measure, such as the root mean square error (RMSE). Other measures may be based on calculating entropy, or a variance or a mean square error (MSE) or other appropriate calculations.

After a case error, or similarity measure, is calculated between each classifier parameter and the new case, the classifier engine determines that the new case "belongs" to the classification of the "most similar" classifier parameter, that is, the parameter for which the case error is the smallest, or for which the similarity is greatest. If the case error is less than a pre-defined or dynamically generated "segmentation error threshold", the classification process is complete and the classifier engine passes the new case and the "most similar" classifier parameter to a gate 70, which feeds this data to an output channel 110. In a personalized advertising system, for example, the classifier parameter might be keyed to an advertisement that is to be sent to a user. Output from gate 70 is generally implemented when the dynamic classifier is a serial processing element of a big data pipeline. When the dynamic classifier operates in parallel with other elements of a big data stream, the output of gate 70 may not be implemented.

If the new case is anomalous, that is, the case error measured with respect to the most similar classifier parameter is greater than the segmentation error threshold, then the classification scheme is updated by a regrouping process, described further hereinbelow with respect to FIG. 2. The regrouping process is implemented by the incremental updater, which receives results of the process implemented by the classifier. These results may include all or part of the classification calculations. In one embodiment, the results include: the new case, the most similar classifier parameter, and the respective case error. The results may also include multiple error measures and multiple corresponding parameters.

In some embodiments, the regrouping process implemented by the incremental updater includes generating additional classifier parameters for the classification scheme, parameters that then replace the most similar parameter. The additional parameters may be generating by performing regrouping, e.g., a re-clustering, of the cases of the most similar buffer or "select buffer", that is, the cases stored in a case buffer represented by the "most similar parameter". In addition, updating may include removing some cases from the select buffer. Removed cases are typically transferred from the case buffer through an interface 120 to an external network 130, for receipt by a central controller 80. The central controller may manage a case history 90. Management of the case history typically relies on a framework for version control, which may provide an evolutionary trace of changes to the classification scheme.

Cases may be removed from a case buffer in order to reduce the processing load required by the regrouping process. Various criteria may be applied to determine which cases are to be removed from a buffer, such as a first-in-first-out (FIFO) criterion, which removes cases according to the length of time they have been in the buffer. Alternatively or additionally, removal can be based on an outlier criterion, whereby cases are removed that least represent the majority of cases in the buffer, for example because they are characterized by being furthest from the classifier parameter, as measured in the vector space of cases. In embodiments of the present invention, cases are removed from a buffer by the incremental updater in order to reduce the size of the select case buffer, based on a maximum size parameter set as a "buffer threshold".

In alternative embodiments, a new case may be associated with multiple classifier parameters, in the event that the similarity measures between the new case and the multiple classifier parameters are less than a preset or dynamically set similarity threshold. In this event, the incremental updater may be configured to merge the multiple respective buffers. In some embodiments, case buffers may be merged by the incremental updater when similarity measures between all the cases in the merged buffer and the generated classifier parameter for the merged buffer are less than the similarity threshold.

In additional embodiments, dynamic classifier 30 is similar to multiple additional remote autonomous classifiers 140 that operate in a distributed manner over network 130. In such embodiments, the case buffers, as well as the case history, may be maintained by the central controller 60. In a distributed environment, regardless of whether or not case buffers are centrally maintained, the contents of the case buffers and the classifier scheme may be synchronized between the multiple classifiers. Synchronization may be performed after each regrouping process, that is, the incremental updater of the local dynamic classifier will initiate synchronization with the remote autonomous classifiers 140.

The incremental updater may also be configured to monitor the time required to implement each regrouping process. In some embodiments, the selection of a regrouping algorithm to implement may be determined by time delays, which are tracked and/or anticipated, in conjunction with pre-set time constraints or criteria.

In further embodiments, the incremental updater may also be configured to apply the above mentioned time parameters to dynamically set parameters including the buffer threshold, the segmentation error threshold, and the similarity threshold. The system may also be configured such that the incremental updater sends the results of classification of a new case to the gate after the regrouping is performed. In general, the functions of modules of the dynamic classifier as described herein may be performed by different modules or submodules in alternative embodiments of the present invention.

The central controller may also provide a user interface 150, which permits operators connected locally or remotely over the network 130 to query the status of the case buffers and the case history. Users may also interactively review the classification scheme, providing labels to parameters, to facilitate knowledge discovery based on identifying and classifying new cases.

Modules of the dynamic classifier are generally configured for handling big data requirements, as described above. For example, modules may have distributed, pipeline architectures and may include queuing mechanisms, such that communications between the modules are not disrupted by variable processing times. In general, some or all modules operate asynchronously, such that operations of the different modules proceed concurrently, in parallel, for maximum efficiency. For example, the classifier engine may process many cases concurrently, and the incremental updater may generate parameters from different buffers concurrently. In alternative embodiments, to support applications with more rigid constraints, operations may be performed synchronously. Parameters may also be set for automatic switching between synchronous and asynchronous operation.

Figure 2:
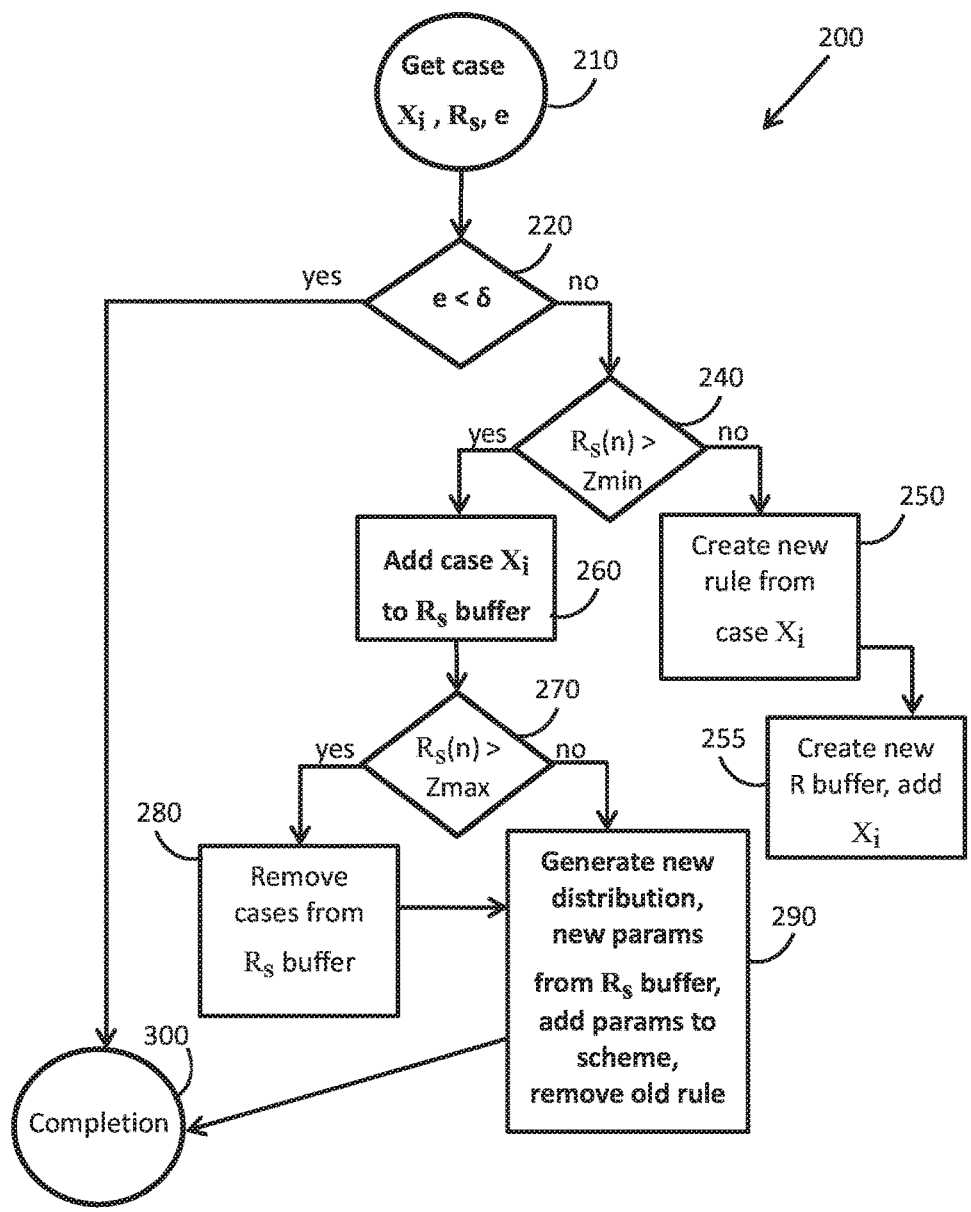
FIG. 2 shows a flow diagram of a process for real-time data classification and modification of a classification scheme, according to an embodiment of the present invention.

The details of the process of updating the classification scheme and the case buffers are described in more detail with respect to FIG. 2.

FIG. 2 is a flow diagram of a process 200 for updating a classification scheme, according to an embodiment of the present invention. Process 200 represents details of steps that may be performed by the incremental updater described hereinabove with respect to FIG. 1. In alternative embodiments, the steps of process 200 may be performed by other modules in alternative configurations of the present invention.

At a first step 210, results are received from a classification process, such as may be provided by the classifier engine described above. These results include a new case, $X_i$, an error measure, e, also referred to herein as a "case error", and a parameter, $R_s$, which, is the "most similar" classifier parameter of the classification scheme, that is, the classifier parameter for which the case error or "distance" to the new case is a minimum.

At a conditional step 220, the case error is compared with a segmentation error threshold, $\delta$. The segmentation error threshold may be set manually by human operators of the system, based on many criteria, such as the density of cases in the case space and the granularity of clustering that is appropriate for reflecting tangible differences between cases. The threshold may be modified to improve system response and/or lower system costs (such as processing and storage/memory size). The incremental updater may also automatically generate and/or modify the segmentation error threshold, as well as other system thresholds, such as the buffer threshold and the similarity threshold described above to meet the time and cost criteria of a given application.

If the case error is less than the segmentation error threshold, the classification scheme requires no updating. Case $X_i$ may be added, at a completion step 300, to the "select" case buffer corresponding to the "most similar" classifier parameter $R_s$ (stored as indicated with respect to FIG. 1 in case buffers 90). Alternatively, the case may be ignored, as the system may be configured to store cases only according to certain criteria, such as storing only anomalies, as described below.

If the case error is greater than the segmentation error threshold, the classification scheme is updated. In additional embodiments, the decision to update the classification may be made according to other parameters of a buffer instead of, or in addition to, the case error. For example, the decision may be made based on a measure of the standard deviation of the cases in the buffer.

The updating process begins with a conditional step 240. At this step, the number of cases in the select case buffer, indicated in the chart as $R_s(n)$, is compared with a minimum buffer size limit, indicated as Zmin. This limit may be set by human operators or may be an automated configuration, such as that performed with respect to other system thresholds, as described above. If the size of the select buffer is greater than Zmin, then the classification scheme is updated by adding the new case to the select buffer, at a step 260. If the select buffer size is smaller or equal to Zmin, the size is too small for clustering, and the select parameter and the select buffer are not modified. Instead, at a step 250 a new classifier parameter is generated from the singular new case. In some embodiments the new parameter is a vector, defined as the vector representing the new case. At a step 255 the new case is stored in a new case buffer corresponding to the new parameter.

If the size of the select case buffer is sufficiently large for regrouping to be performed, the new case is stored in the corresponding case buffer at step 260, as described above. Next, at a conditional step 270, the size of the select case buffer, now including the new case, is compared with a parameter Zmax, a maximum buffer threshold.

If the size of the select case buffer is greater than the maximum buffer threshold, then at a step 280 some cases may be removed from the select group (with changes being recorded in the case history). As described above with respect to FIG. 1, criteria may be applied to determine which cases are to be removed, such as a first-in-first-out (FIFO) criterion, by which the earliest cases are removed, or an outlier criterion, removing cases that least represent the majority of cases in the group, or by various other criteria. Following step 280, or instead of step 280 if the buffer does not exceed the threshold size, step 290 is performed.

At step 290, a regrouping process is implemented which will generally segment the select case buffer into two or more new groups, stored in new respective case buffers, each new case buffer represented by a new classifier parameter. Algorithms that may be employed to implement the regrouping process include the clustering algorithms described above, such as the "k-means", "hierarchical", "projected" and "subspace" clustering algorithms. The number of new groups to be generated may be determined by a criterion of segmentation quality, such as an RMSE threshold. In some embodiments, the algorithm implemented may determine that a single buffer is sufficient to meet the quality criterion, such that the buffer is not regrouped but a new classifier parameter is calculated, given that the buffer has been changed to include the new case. In further embodiments, as new cases are received by the system, some or all of the new cases are added to their appropriate buffers after being classified. Subsequently, classifier parameters may be recalculated only when anomalous cases are processed.

In further embodiments, the type of algorithm implemented by the regrouping process, or the criteria of the algorithm, may be determined dynamically, in order to meet real-time constraints of the application. For example, a less computationally intensive algorithm may be employed when the processing time would otherwise exceed the time limitations required. Alternatively or additionally, the criteria such as the number of iterations of an iterative process, may be changed, or the number of attributes of multi-dimensional parameters may be reduced. Furthermore, a trade-off is generally made between an optimal regrouping and the processing time required.

In embodiments of the present invention, the various regrouping methods that may be employed are implemented with respect to the select case buffer, without changing any of the other groupings established by the initial segmentation and by the subsequent regroupings.

After new case buffers are generated from the select case buffer, the new parameters are added to the classification scheme. The former "most similar" classifier parameter is removed from the classification scheme being moved to a versioning history as described above.

In further implementations of the present invention, updating the classification scheme may also include merging of parameters when a new case indicates a similarity between two or more parameters. As described above with respect to the case error threshold, thresholds of the system may be set by human operators or by an automated process based on more general criteria such as a targeted storage size and processing delay for updating the classification scheme. Thresholds that may be set dynamically include Zmax, the maximum buffer threshold, and Zmin, the minimum group size limit, as well as the selection of an algorithm for the regrouping process and selection of criteria for segmentation quality, such as number of iterations of an iterative algorithm.

The process of updating the classification scheme is completed at a step 300, which may include synchronization of the classification scheme with remote autonomous classifiers, as described above with respect to FIG. 1.

As described above, the present invention provides a system and methods for updating classifier parameters in real-time, that is within cost and time constraints of a given real world application, for example, within 1 second or within 5 seconds or less than 15-20 seconds or less than one minute response or less than 3 minutes response, depending on the context of the application used. One exemplary application for the system and methods provided is a screening gate including biometric sensors that screens travelers entering a high security area such as an airport. The sensors may be configured to test multiple parameters of a traveler, such as heart rate, heart pressure, perspiration, etc. The classification system may be set to measure two classes of travelers, the bulk of travelers who have "normal" parameters and should pass the biometric screening without interference, and those who should be checked by security personnel. Over the course of a day, environmental conditions change, causing changes in the measured parameters. The classification system provided by the current invention changes in real-time to incorporate the changing measurements.

A further exemplary application for the present invention could be in screening conversations that are obtained by electronic eavesdropping. Phrases used in "normal" conversations may be distinguished from "abnormal" phrases, which may trigger a security response. Over time, the cluster of "normal" phrases may change, for example in response to major news stories. Real-time modification of a classification scheme by the system and methods presented herein provide means for identifying the abnormal phrases, even while the definition of a "normal" range is changing.

A further exemplary application could be a retail system for generating personalized supermarket promotions. The retail system could be configured to offer someone who has bought a certain grouping of products a coupon for a future purchase of a product in the same grouping. Groupings may be defined by the system based on solely on clustering the products based on the frequency with which combinations of products are purchased by individual customers. The system and methods of the present invention provide means for modifying product groupings in real-time, for example as new products are introduced or as days or seasons change.

All or part of dynamic classifier 30 and of process 200 can be implemented in digital electronic circuitry, or in computer hardware, firmware, software, or in combinations thereof. All or part of the system and process can be implemented as a computer program product, tangibly embodied in an information carrier, such as a machine-readable storage device or in a propagated signal, for execution by, or to control the operation of, data processing apparatus, such as a programmable processor, computer, or deployed to be executed on multiple computers at one site or distributed across multiple sites. Memory storage may also include multiple distributed memory units, including one or more types of storage media. Examples of storage media include, but are not limited to, magnetic media, optical media, and integrated circuits such as read-only memory devices (ROM) and random access memory (RAM).

A computing system configured to implement the dynamic classifier may have one or more processors and one or more network interface modules. Processors may be configured as a multi-processing or distributed processing system. Network interface modules may control the sending and receiving of data packets over networks.

Method steps associated with the system and process can be rearranged and/or one or more such steps can be omitted to achieve the same, or similar, results to those described herein. It is to be understood that the embodiments described hereinabove are cited by way of example, and that the present invention is not limited to what has been particularly shown and described hereinabove. Rather, the scope of the present invention includes variations and modifications thereof which would occur to persons skilled in the art upon reading the foregoing description and which are not disclosed in the prior art.

The invention claimed is:

1. A computing system comprising:
   at least one processor; and
   at least one memory communicatively coupled to the at least one processor comprising computer-readable instructions that when executed by the at least one processor cause the system to categorize, in real time, case data from a big data stream by:
   generating a classification scheme by grouping a set of cases of the case data into a plurality of case buffers represented by a plurality of respective classifier parameters, wherein each case buffer is limited to a size of a maximum buffer threshold;
   receiving a new case;
   responsively determining from among the plurality of classifier parameters a classifier parameter most similar to the new case, and a case error indicating a difference between the new case and the most similar classifier parameter;
   determining that the case error is greater than a segmentation error threshold and responsively adding the new case to a most similar case buffer represented by the most similar classifier parameter;
   subsequently, determining that the number of cases stored in the most similar case buffer is greater than the maximum buffer threshold, and responsively removing one or more cases from the most similar case buffer;
   subsequently generating one or more regrouped case buffers from the most similar case buffer, according to a criterion of segmentation quality; and
   adding to the classification scheme one or more new classifier parameters representing the one or more regrouped case buffers, and removing from the classification scheme the most similar classifier parameter.

2. The system of claim 1, wherein removing the one or more cases from the most similar case buffer comprises removing one or more cases according to at least one of an outlier criterion and a "first-in" criterion.

3. The system of claim 1, wherein removing the one or more cases comprises saving the one or more cases in a case history.

4. The system of claim 1, further comprising automatically setting the maximum buffer threshold, the segmentation error threshold, and the criterion of segmentation quality responsively to a processing time target.

5. The system of claim 1, wherein generating the one or more regrouped case buffers comprises selecting a clustering algorithm according to a time constraint and applying the clustering algorithm to the most similar case buffer.

6. The system of claim 1, further comprising generating a new classification scheme on a local server and comprising synchronizing the new classification scheme between the local server and a remote server.

7. The system of claim 1, wherein generating the one or more regrouped case buffers comprises generating the one or more regrouped case buffers only from cases in the most similar case buffer, and adding to the classification scheme the one or more new classifier parameters comprises adding only the new classifier parameters representing the one or more regrouped case buffers.

8. The system of claim 1, wherein the plurality of classifier parameters comprises at least three classifier parameters, wherein the most similar classifier parameter comprises at least two classifier parameters meeting a similarity threshold with respect to the new case, and wherein adding the new case to the most similar case buffer comprises generating the most similar case buffer by merging the case buffers represented by the at least two classifier parameters meeting the similarity threshold.

9. The system of claim 1, wherein receiving the new case comprises normalizing a received data record.

10. The system of claim 1, wherein the most similar classifier parameter is determined by calculating error measures between the new case and all classifier parameters in the classification scheme and setting the most similar classifier parameter as the classifier parameter having the minimum error measure.

11. The system of claim 1, further comprising receiving a second new case and responsively determining from among the plurality of classifier parameters a second classifier parameter most similar to the second new case, determining a second case error indicating a difference between the second new case and the second most similar classifier parameter, and determining that the case error is smaller than the segmentation error threshold and responsively not adding the second new case to any of the plurality of case buffers.

12. A method for categorizing, in real time, case data from a big data stream, implemented by an information handling system that includes a memory and a processor, the method comprising:
   generating a classification scheme comprising a plurality of classifier parameters, wherein the generation of the classification scheme comprises grouping a set of cases of the case data into a plurality of case buffers, each case buffer being represented by a corresponding classifier parameter of the plurality of classifier parameters;
   receiving a new case;
   responsively determining from among the plurality of classifier parameters a classifier parameter most similar to the new case, and a case error indicating a difference between the new case and the most similar classifier parameter;
   determining that the case error between the new case and the most similar classifier parameter is greater than a segmentation error threshold and responsively adding the new case to a most similar case buffer represented by the most similar classifier parameter;
   subsequently, determining that the number of cases stored in the most similar case buffer is greater than a maximum buffer threshold, and responsively removing a case other than the new case from the most similar case buffer;
   subsequently generating one or more regrouped case buffers from the most similar case buffer, according to a criterion of segmentation quality; and
   adding to the classification scheme one or more new classifier parameters representing the one or more regrouped case buffers, and removing from the classification scheme the most similar classifier parameter.

* * * * *